SYNCHRONOUS CLOCK PULSE GENERATOR

Filed July 3, 1962 5 Sheets-Sheet 1

DOUGLAS R. MAURE
INVENTOR.

BY Fraser and Bogucki
ATTORNEYS

July 28, 1964 D. R. MAURE 3,142,802

SYNCHRONOUS CLOCK PULSE GENERATOR

Filed July 3, 1962 5 Sheets-Sheet 2

SYNCHRONOUS CLOCK PULSE GENERATOR

Filed July 3, 1962 5 Sheets-Sheet 3

July 28, 1964 D. R. MAURE 3,142,802

SYNCHRONOUS CLOCK PULSE GENERATOR

Filed July 3, 1962 5 Sheets-Sheet 4

SYNCHRONOUS CLOCK PULSE GENERATOR

Filed July 3, 1962

5 Sheets-Sheet 5

United States Patent Office 3,142,802
Patented July 28, 1964

3,142,802
SYNCHRONOUS CLOCK PULSE GENERATOR

Douglas R. Maure, Pasadena, Calif., assignor to Telemetrics, Inc., a corporation of California
Filed July 3, 1962, Ser. No. 207,176
22 Claims. (Cl. 328—55)

This invention relates to data processing systems and more particularly to systems for generating clock pulses in synchronization with digital information signals having variable bit repetition rates.

A number of different methods have been devised for transmitting digital information from one location to another. Each method involves the transmission of an electrical signal which has some characteristic (such as its frequency, duration or amplitude) varied in a manner which indicates the information content. Where the digital information is in binary form, each individual binary digit or bit of digital information is allotted one of a number of recurring equal intervals (termed bit intervals) during which the signal characteristics or changes therein signify the specific bit of digital information. The digital information may be derived by determining what the signal characteristics are within each bit interval.

Binary digital information is normally represented by varying a signal characteristic between first and second values or by varying the signal in a first or a second sense. There are any number of schemes (termed codes) for representing binary digital information. For example, a first binary code may indicate a digit value of one by the presence of a change of state during some portion of a bit interval and a digit value of zero by the absence of a change of state during a bit interval while a second binary code may represent a digit value of one by a first potential level during a bit interval and a digit value of bero by a second potential level during a bit interval.

In binary codes such as those mentioned above it is possible to represent a great number of sequential bits of binary digital information without any change in the signal, e.g., a sequence of bits each having a zero digit value is represented by a constant potential level according to either of the above-mentioned codes. It is therefore necessary for a system which is to receive the binary digital information to have some means for determining the bit interval in order to derive the binary digital information from the transmitted signal. If the bit interval is known (or its rate of recurrence which is termed the bit repetition rate), the number of binary digits which occur within any specific period and the instants during which a signal characteristic has information significance may be determined. Although it is possible to transmit signals indicative of the bit repetition rate to the receiving system by means of a separate transmission channel, the complication in equipment involved renders such arrangements impractical. For this reason, the bit repetition rate is preferably derived from the received signal carrying the digital information, hereafter referred to as the information signal.

Generally, a system which is to receive digital information signals is equipped with circuitry for examining the information signals to determine the bit repetition rate, additional circuitry for generating a train of pulses (termed clock pulses) at the bit repetition rate in response to the determination, circuitry for regulating the clock pulses to appear coincidently (in synchronism) with the bit intervals of the transmitted information signals and circuitry for utilizing the clock pulses to derive the digital information from the information signals.

It will be appreciated that a positive synchronization must be achieved between the information signals and the clock pulses without error. However, if an attempt to accomplish errorless synchronization too great a time period is consumed, a great deal of information may be lost before clock pulses become available at correct times to indicate the meaning of the information signals.

Many prior art systems include integration networks of deriving a control signal from the information signals for operating a clock pulse generator for producing clock pulses. However, integrating networks normally have fixed time constants determined by the circuit component values. The fixed constant maintains the time required for synchronization constant even though the bit repetition rate varies. If the rate becomes appreciably higher than the average rate for which the integration network is designed, a substantial amount of information may be lost before synchronization is accomplished. Moreover, in the absence of an applied signal, the output signal from an integrating network does not remain constant, so that the repetition rate of the clock pulses in system utilizing integrating networks will change during intervals in which the information signal is lost. If the repetition rate of the clock pulses changes during intervals in which the information signal is lost, the system must be resynchronized after each loss with an attendant loss of digital information.

Electrical noise creates another problem in systems in which digital information is transferred from one location to another since noise often displays changes in characteristics substantially like the changes which indicate digital information in the received signals. Thus, noise may be falsely interpreted as information when received coincidently with the information signals. One method of minimizing the effects of electrical noise involves inhibiting the receipt or utilization of input signals except durng a portion of each bit interval. This may be accomplished without loss of digital information since only a specific portion of a bit interval need be monitored to determine the information significant characteristics. This method of noise rejection (noise rejection gating) may be accomplished once synchronization is obtained by utilizing the clock pulses to time the transfer of the input signals to utilization circuits to occur only during the information significant portion of each bit interval.

However, in systems for receiving signals coded in such a manner that a great deal of information may be indicated without a change in information signal characteristics, the rejection of a significant portion of the information signal renders it extremely difficult to determine whether the system is in synchronization or not, especially so where the bit repetition rate is subjected to variation. For example, characterisitc changes in the information signal may be absent during the transmission period of the bit intervals because information is being transmitted or because the bit repetition rate has changed so that information significant signal portions are no longer received during the operational intervals. Where information pulses are intentionally absent in order to indicate information, there is no need to resynchronize the clock pulse generating equipment or to operate the receiving circuitry for greater portions of a bit interval in order to receive the information signals, and to do so would allow noise to substantially degrade the information signals received. On the other hand, when the bit repetition rate has changed, it is necessary to resynchronize the clock pulse generating equipment so that information signals will not be lost by failure to pass the noise rejection gating circuitry.

The problem is further complicated in systems adapted to generate clock pulses from signals of a number of different code forms. For example, in one code, changes in the potential levels of an information signal may indicate the digit values whereas, in another code, the levels themselves may indicate the digit values. In order to monitor the different characteristics which are of significance in the different codes, it is often necessary to monitor the information signal during different portions of the bit intervals. A system operating with signals containing information in a number of binary codes thus must be flexible enough to react as required by the different codes.

No prior art system is known which will generate and synchronize clock pulses with digital information signals having a variable bit repetition rate within an optimum period without a substantial possibility of synchronization error. Nor is any known system capable of generating clock pulses at a constant rate for substantial periods during which no information signals are received. No known system with the foregoing desirable features provides a method for eliminating a substantial amount of the noise which may be received with the information signals. Nor is any known system capable of providing clock pulses in synchronization with a number of different binary coded information signals.

It is therefore a general object of this invention to provide an improved synchronous clock pulse generator system.

Another object of this invention is to provide a system capable of synchronizing generated clock pulses with information signals in the shortest feasible time without a substantial possibility of error.

Yet another object of this invention is to provide a synchronous clock pulse generator system capable of responding to signals which may carry information in a number of different binary codes.

A further object of this invention is to provide a synchronous clock pulse generator system which synchronizes at a speed which depends upon the bit repetition rate of the information signals.

Another object of this invention is to provide a synchronous clock pulse generator system which will generate clock pulses at an established repetition rate during substantial periods in which no information signals are received.

A further object of this invention is to provide synchronous clock pulse generator systems which are substantially insensitive to electrical noise.

Briefly, in accordance with an aspect of the invention a unique system is provided including an input circuit for receiving information signals, a data converter for converting all received information signals into digital information signals of a preferred form, a controllable oscillation generator, a frequency-dividing counter operated by signals from the oscillation generator and reset in response to the converted information signals for providing clock pulses in phase synchronization with the converted information signals, a digital counter, and an analog voltage generator operatively responsive to the clock pulses and the converted information signals for controlling the frequency of the oscillation generator, and a noise rejection control circuit operated by the clock pulses to regulate the interval of operation of the data converter to occur only during the time of appearance of selected portions of the information signals.

The digital counter may comprise a reversible counter circuit which has input circuitry arranged to compare the generated clock pulses with the information signals for indirectly controlling the sense of the count to depend on the sense of the difference between the repetition rate of the clock pulses and the bit repetition rate. The reversible counter circuit is arranged to count in the sense determined by its input circuitry, but only in response to digit values of one in the information signal so that once synchronization has been established the counter will maintain a constant condition and the analog voltage generator will provide a constant valued control signal for operating the oscillation generator until such time as a change in the information signal bit repetition rate occurs. Since the oscillation generator determines the clock pulse repetition rate, the generation of clock pulses at an established repetition rate will continue even though information signals are not received for a substantial period. Furthermore, since the digital count changes only in response to information signals, the rate of change (and thus the time required for synchronization) will vary with the bit repetition rate of the information signals.

The noise rejection circuit is controlled in accordance with the clock pulses for operating gates to allow input signal utilization only during the portions of bit intervals in which information significant signal characteristics are expected. Furthermore, the noise rejection arrangement responds to a lack of information signals of digit value one over a prescribed period (signifying a loss of synchronization) to enable the continuous utilization of all input signals until a resynchronization of the clock pulses is obtained.

If the bit repetition rate of the information signals is known to be substantially constant, the system provides for the generation of clock pulses under the control of a crystal oscillator in order to achieve additional stability. The same advantages are obtained with regard to phase synchronization, noise rejection, and information signal conversion when operating with a crystal controlled generator; and furthermore, certain portions of the system may be disabled to effect a substantial reduction in operating power.

The invention will be better understood from a consideration of the following detailed description taken together with the drawings in which like elements in the various figures have like designations and in which.

Figures 1, 6:
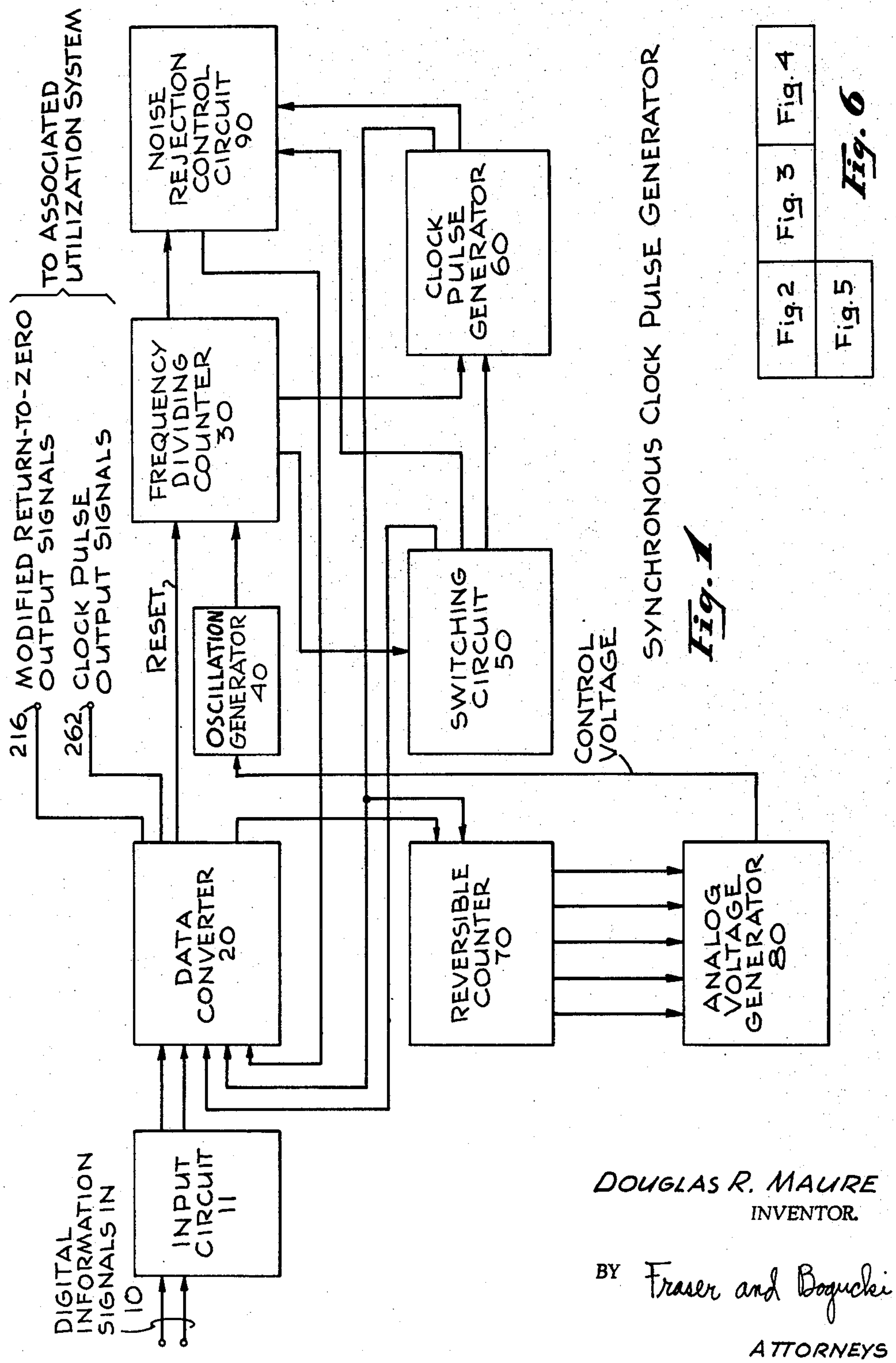
FIG. 1 is a block diagram of a synchronous clock pulse generator system in accordance with the present invention.
FIG. 6 is a diagram illustrating the proper arrangement of FIGS. 2–5 to form a specific system such as shown in FIG. 1.

In FIG. 1 is shown a block diagram of a synchronous clock pulse generator system in accordance with the invention which may be used in conjunction with systems for deriving digital information from received information signals. The information signals are received by the synchronous clock pulse generator at a plurality of input terminals 10 of an input circuit 11. The input circuit 11 may include conventional means for receiving digital information signals, as for example, radio receivers, circuits for deriving digital signals from storage mediums (such as magnetic tape), signal simulating circuits and the like. The input circuit 11 may also include various filters and other conventional arrangements for eliminating noise from the received signals and for reshaping the received information signals into the digital form in which they were originally transmitted.

The received information signals in the form of direct-current pulses and potential levels are applied to a data converter 20 which changes the signals to a preferred digital code form as required by the specific data processing or the utilization system with which the system of FIG. 1 is to operate. The digital code, of course, may vary with the specific associated utilization system. In illustrative clock pulse generator system in accordance with this invention, the information signals are converted to signals of what may be called a modified return-to-zero code in which the presence of a short pulse of a first polarity during a specific portion of a bit interval is indicative of a binary digit value of one while the absence of a pulse during a bit interval (the continuation of the established potential level) is indicative of a binary digit value of zero. The converted information signals coded in modified return-to-zero form are available for utilization by the associated system (not shown) at an output terminal 216 of the data converter 20.

The data converter 20 also functions to derive signals representing the binary digit having a digit value of one (hereafter designated as binary ones) from the information signals. The binary one indication signals are transferred to reset a frequency-dividing counter 30.

The frequency-dividing counter circuit 30 receives driving waves from an oscillation generator 40 which may comprise either a voltage-controlled oscillator or a crystal oscillator or both. The oscillation generator 40 generates an oscillatory waveform having a frequency which is a harmonic of the bit repetition rate of information signals with which synchronization is desired. The frequency-dividing counter 30 has a number of stages of two state bistable circuits and functions to count the cycles of the generated oscillations so that by monitoring the condition of the bistable circuit of an appropriate stage, pulses may be derived at a repetition rate which is a subharmonic of the frequency of the oscillations generated by the oscillation generator 40. The pulses derived may be utilized as clock pulses. The clock pulses are brought into phase synchronization with the bit intervals of the information signal by the binary one indication signals which are applied (as mentioned above) to reset the counter circuit 30 so that its count and the clock pulses derived therefrom coincidently with a binary ones of the information signal. This arrangement in association with the circuitry for operating the oscillation generator 40 at a frequency which is an exact harmonic of the information signal bit repetition rate accomplishes the synchronization of the generated clock pulses with the incoming information signals.

The stage of the frequency-dividing counter 30 from which clock pulses are derived is selected by means of a switching circuit 50 which receives signals from the bistable circuits of all of the counter stages. For convenience of illustration, the connections between the counter circuit 30 and the switching circuit 50 of FIG. 1 are shown as a single lead. The selected clock pulses from the switching circuit 50 are applied to a clock pulse generator 60 to generate clock pulses which are applied to a reversible counter 70, a noise rejection control circuit 90 and the data converter 20. The data converter 20 utilizes the clock pulses for conversion of the information signals and also furnishes the clock pulses for use by the associated utilization circuitry at a terminal 262.

The reversible counter 70 includes an input control arrangement which controls the sense of the count made by the reversible counter 70. The input control arrangement directs the count to take place in a first or a second sense depending on the relative appearance times of the clock pulses and the binary one indication signals and thus on pulse repetition rates of the information signals and the clock pulses. If the clock pulses have a lower repetition rate than the information signals and thus appear after the binary one indication signals, the reversible counter 70 will be controlled to increase its count while if the clock pulses have a higher repetition rate than the information signals and appear before the binary one indication signals, the reversible counter 70 will be controlled to decrease its count.

The reversible counter 70 has a plurality of interconnected bistable circuits which are connected to allow counting in two senses. Signals representing the conditions of the individual bistable circuits of the reversible counter 70 are furnished to an analog voltage generator 80 which applies signals for controlling the voltage-controlled oscillator of the oscillation generator 40. When the repetition rate of the clock pulses is less than the bit repetition rate, the analog voltage generator 80 furnishes a voltage for causing the frequency of the oscillation generator 40 to increase. As the repetition rate of the clock pulses increases, the clock pulses come into both rate and phase synchronization with the information signals. On the other hand, when the repetition rate of the clock pulses is greater than the bit repetition rate, the analog voltage generator 80 furnishes a voltage for reducing the frequency of the oscillations generated by oscillation generator 40 and thus for reducing the repetition rate of clock pulse signals to bring the clock pulses into synchronization with the information signals. As will be explained, the input arrangement for the reversible counter 70 allows the count stored therein to change only when binary one information signals are actually received. When binary one information signals are not received, the reversible counter 70 remains at an established count, and the oscillation generator 40 continues to furnish oscillations at a constant frequency even though information signals may actually be missing for a substantial period.

The clock pulses applied to the noise rejection control circuit 90 control a logic arrangement which produce output signals for operating transmission gates in the data converter 20. The length of the output signals furnished by the noise rejection control circuit 90 may be selectively controlled so that the data converter 20 functions to pass signals only during a prescribed portion of each bit interval. Thus the time interval of receipt of input signals may be reduced to encompass only periods during which information significant portions of the information signal are expected. The circuit 90 also includes an arrangement which functions to enable the transmission by the noise rejection gates of the data converter 20 continuously after a substantial number of bit intervals have passed without the receipt of any binary one information signals so that resynchronization may be accomplished.

In summary then, the system shown in FIG. 1 receives digital information signals at the input circuit 11, converts the information signals into signals of a preferred binary code at data converter 20 for use at a terminal 216 and generates binary one indication signals for operating a unique digital synchronization arrangement and a noise rejection control circuit 90. The binary one indication signals are furnished to reset the frequency-dividing counter 30 which is driven by oscillations from the oscillation generator 40 to achieve phase synchronization of the clock pulses produced by the frequency-dividing counter 30 with the information signals. The generated clock pulses are furnished with the binary one indication signals to the reversible counter 70 to control the rapidity and the sense of its count in order to synchronize the repetition rate of the clock pulses with the bit repetition rate of the information signals. The count of the reversible counter 70 causes the analog voltage generator 80 to furnish a voltage control signal which determines the frequency of oscillation of oscillation generator 40 and thus the clock pulse repetition rate. The clock pulses are also supplied to the noise rejection control circuit 90 for controlling the duration of operation of noise rejection gates in the data converter 20. A unique counting arrangement is included in the noise rejection control circuit 90 for determining the duration of absence of binary one indication signals in order to enable the noise rejection gates continuously to allow resynchronization.

Before referring to the remaining figures of the drawings which describe the details of specific circuits which may be used in the system of the invention, certain conventions followed in the drawings and the description will be discussed in order to facilitate a better understanding of the invention. First, a number of two-state circuits are indicated in the drawings by two adjacent circles with diagonal connecting lines drawn therebetween. Bistable ones of the two state circuits are generally indicated by two crossed lines connecting the circles whereas the monostable ones of the circuits have only a single connecting line. The triangular components marked with an "N" in the figures indicate what may be described as NOR gates. A NOR gate is such that the presence of potentials indicating binary zeros on all of the input terminals will cause a second potential indicating a binary one to appear to the output, whereas the presence of the binary one potential on any input terminal will result in a binary zero potential at the output terminal of the NOR gate. Such a gate is well-known in the art and may be realized, for example, by connecting an OR gate to the input of an inverter circuit. The squares designated "I" in the figures indicate simple binary inverter circuits which are such that a binary one potential on an input conductor causes a binary zero potential to appear on the output conductor and vice versa. Such circuits are well-known in the art and no further description of them is believed to be necessary.

In one specific arrangement of the system, two potential levels, ground (or reference) potential and a minus twelve volt potential with respect to the ground potential are used to indicate two binary digits zero and one, respectively, of the information signals.

Figure 2:
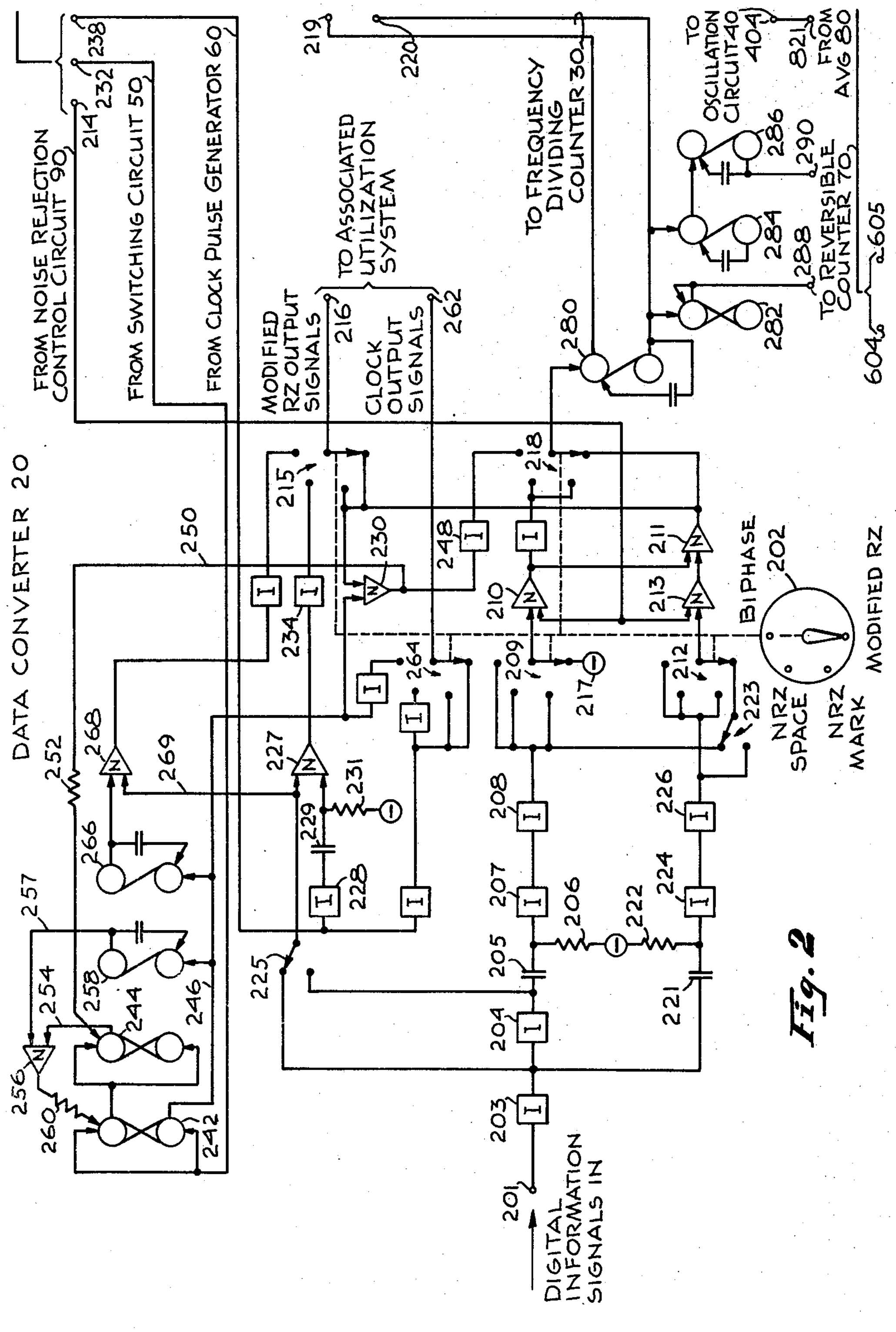
FIG. 2 is a block diagram of a data converter for use in the system shown in FIG. 1.

Referring now to FIG. 2 there is shown a data converter 20 which may be used in the system shown in FIG. 1. The data converter 20 receives digital information signals from the input circuit 11 of FIG. 1 at a terminal 201. The specific data converter 20 shown in FIG. 2 is adapted to process digital information signals of four binary codes; biphase, modified return-to-zero, non-return-to-zero-space and non-return-to-zero-mark which are hereafter defined for the purposes of this invention. In biphase coding, a pulse appearing in the first half of a bit interval represents a binary one while a pulse appearing in the second half of a bit interval represents a binary zero. In non-return-to-zero-space coding, a ground potential level extending for an entire bit interval represents a binary zero, and a negative potential level extending for an entire bit interval represents a binary one. In non-return-to-zero-mark coding, a change of amplitude between potential levels in either direction represents a binary one while a constant level of potential represents a binary zero. In modified return-to-zero coding, a ground potential during an entire bit interval represents a binary zero while a negative pulse of short duration during a bit interval which returns to ground potential represents a binary one.

It will be noted that the data converter circuit 20 of FIG. 2 has a movable switch control 202 for operating a number of multiple contact switches 209, 212, 215, 218 and 264, the selector terminals of which are ganged together. Selection of a position on the switch control moves each selection terminal to the proper one of multiple contacts thereby connecting the proper components by which the different types of digital information input signals are processed to derive binary one indication signals and to convert these different types of input signals to output signals coded in return-to-zero form. In operation, the switch control 202 is placed in the appropriate position for processing the binary code input signals being received and the multiple contact switches 209, 212, 215, 218 and 264 accomplish the appropriate connections.

Input information signals of the modified return-to-zero code received at the terminal 201 are passed by first and second inverter circuits 203 and 204 and applied to a differentiating circuit including a capacitor 205 and a resistor 206. The resistor 206 is connected to a source of negative potential so that the differentiating circuit functions to produce sharpened negative pulses from the leading edges of the binary pulses in the modified return-to-zero signal. The sharpened negative pulses are passed by two additional inverter circuits 207 and 208 and applied to the multiple contact switch 209. Sharpened positive going pulses produced by the differentiating circuit from the trailing edges of the incoming binary pulses are not passed by the succeeding circuitry. As pointed out above, the switch 209 is ganged to the switch control 202, the selector of which is illustrated in the lower position, which is the position appropriate for processing the modified return-to-zero signals. In the modified return-to-zero position, the multiple contact switch 209 connects a negative potential from a source 217 to one input terminal a first noise rejection NOR gate 210. The negative potential, which corresponds to a continuous binary one indication, causes the first noise rejection NOR gate 210 to apply a ground potential or zero indication to an input terminal of another NOR gate 211 enabling it to transfer the inverse of any signal applied to its other input terminal.

The output signal from the inverter circuit 208 is also applied via a two position switch 223 and the multiple contact switch 212 to a second noise rejection NOR gate 213. The second noise rejection NOR gate 213 is enabled by a ground potential signal applied to a terminal 214 by the noise rejection control circuit 90, shown in FIG.1. This ground potential or binary zero from the noise rejection control circuit 90 will only occur during that portion of a bit interval containing information significant signals. Only during that selected portion of a bit interval when this ground potential signal is applied to the input terminal from the terminal 214 will the second noise rejection NOR gate 213 pass (in inverted form) the signals appearing at the multiple contact switch 212; therefore, all electrical noise received during other than the selected portion (the information sample period) is rejected.

The modified return-to-zero binary one pulses of the information signal, in sharpened form, are passed and inverted twice by the second noise rejection NOR gate 213 and by the NOR gate 211 (enabled by means of the ground potential applied by the first noise rejection NOR gate 210) and applied by the multiple contact switch 215 to a data output terminal 216 for transfer to associated utilization circuitry such as a data processing system, not shown.

The modified return-to-zero information signals are also passed by the multiple contact switch 218 to operate at monostable circuit 280, which furnishes signals at a pair of terminals 219 and 220 for providing reset pulses for application to the frequency-dividing counter 30 and the noise rejection control circuit 90, shown in FIG. 1. The reset signals accomplished the phase synchronization of the clock pulses, which were originally generated at the expected bit repetition rate of the information signals by the frequency-dividing counter 30 (FIG. 1). The signals from monostable circuit 280 also operate the monostable circuits 282, 284 and 286 to produce signals the use of which will be discussed in connection with the reversible counter 70.

An information signal of the modified return-to-zero code but of opposite phase to the above discussed information signal may also be processed by the data converter 20 by selecting the opposite position of the two position switch 223 so that the information signal is passed by a differentiating circuit, including a capacitor 221 and a resistor 222, and a pair of inverter circuits 224 and 226 to the multiple contact switch 212. Since the circuit path including these elements is identical to the priorly discussed circuit path through the capacitor 205 except for the omission of one inverter circuit, the arrangement allows return-to-zero information signals of opposite phase to those discussed above to be handled by the system.

In processing information signals of non-return-to-zero-mark form appearing at the input terminal 201, the switch control 202 is placed in the position designated "NRZ mark" and the signals are transferred through the two differentiating paths coincidently. The non-return-to-zero-mark signals indicate binary ones as a level change in either direction. The circuit path through the multiple contact switch 209 and the first noise rejection gate 210 furnishes pulses indicative of level changes in a first sense only since the NOR gates only sense the sharpened pulses of negative polarity, while the circuit path through the multiple contact switch 212 and the second noise rejection NOR gate 213 furnishes pulses indicative of level changes of the opposite sense only. The pulses derived in the two paths indicating binary ones are summed at the NOR gate 211, passed by the multiple contact switch 215 and applied to the data output terminal 216 as information signals of the modified return-to-zero code. The signals passed by the gate 210 are also passed by the switch 218 and applied to the monostable circuit 280 and to the terminals 219 and 220 for resetting the associated frequency-dividing counter 30 and the noise rejection control circuit 90, shown in FIG. 1.

Since non-return-to-zero space information signals may indicate a sequence of binary ones without a change in potential level, the clock pulses must be synchronized to appear at the proper time so that the number of binary ones present may be determined in effecting a return-to-zero code. To this end, the switch control 202 is placed in the position designated NRZ space and the information signals are conducted from the input terminals 201 through the path including the first noise rejection NOR gate 210. Any level changes to binary ones in the information signal produce pulses which are transferred by the multiple contact switch 218 to the monostable circuit 280. The monostable circuit 280 generates pulses which appear at the output terminals 219, 220, 288 and 290 for synchronizing the clock pulses.

The clock pulses generated are utilized to convert the information signals in the following manner. Clock pulses are applied to a terminal 238 by the clock pulse generator 60 (shown in FIG. 10) and are passed by an inverter circuit 228 to a differentiating circuit including a capacitor 229 and a resistor 231. The sharpened negative pulses produced by the differentiating circuit are then fed to an input terminal of a NOR gate 227.

The clock pulses have a first potential during the first half of a bit interval and a second potential during the second half of a bit interval so that when differentiated, the sharpened negative pulses produced from the edge of each clock pulses during the first half of the bit interval will enable the NOR gate 227 to pass in inverted form signals appearing at the other input conductor thereof during a portion only of the first half of a bit interval. The non-return-to-zero-space information signals appearing at the input terminal 201 are applied via a two position switch 225 to the second input terminal of the NOR gate 227. The NOR gate 227 furnishes pulse output signals in response to the binary one conditions of the information signals to provide inverted modified return-to-zero output signals. The output signals are passed by an inverter circuit 234 and the switch 215 to the output terminal 216. It should be noted that the differentiated clock pulses applied at the gate 227 function to reduce the information sample period and thus to reject a substantial portion of the noise signals much like the noise rejection NOR gates 210 and 213.

The clock pulses utilized to convert the non-return-to-zero-space signals to modified return-to-zero signals are also applied by the switch 264 to a clock pulse output terminal 262 from which system clock pulses may be derived for the associated utilization system, not shown. Clock pulses are provided at the terminal 262 in response to all other forms of information signals as well, as may be determined by investigation the circuit paths between the input terminal 238 and the terminal 262.

When converting information signals of the biphase form to the modified return-to-zero form or when deriving clock pulses therefrom, additional problems arise because both binary digits are represented by like pulses of equal duration which appear either in the first or second half of each bit interval. Even though all pulses have the same characteristics, if a binary one indicative pulse can be identified, a modified return-to-zero signal may be derived by substantially the same process as used for converting non-return-to-zero-space signals, i.e., comparison with the clock pulses at a NOR gate during the half of the bit interval in which the binary one information pulses appear.

To identify a binary one pulse, the circuit is arranged to operate according to the following logical process. Since at least one and only one pulse of the information signals appears during a bit interval and the pulse which does appear falls in either the first or the second half of the bit interval, a change in information signal potential must occur at the middle of each bit interval and no change need necessarily occur at the beginning of a bit interval, e.g., a binary one pulse followed by a binary zero pulse or a binary zero pulse followed by a binary one pulse both present no level change at the beginning of a bit interval. Thus, the clock pulses may be synchronized to appear during the first portion of the bit intervals by first determining a time position during which no change in the information signals need appear and then initiating the clock pulses at that instant.

To accomplish this, the switch control 202 is set to the biphase designations and the information signals are initially conducted through the two differentiating paths connected to the noise rejection NOR gates 210 and 213. The pulses derived by the differentiating arrangements of the two circuit paths are summed at the NOR gate 211 and applied to one terminal of a NOR gate 230. The other terminal of the NOR gate 230 receives potentials indicating the condition of a bistable circuit 242 so the pulses derived from the information signal are passed by the NOR gate 230, an inverter circuit 248 and the multiple contact switch 218 and applied to the monostable circuit 280 under control of the bistable circuit 242.

The clock pulses for converting the biphase information signals are brought into (or checked for) phase synchronization in the following manner. A signal of twice the clock pulse repetition rate (derived from the switching circuit 50 shown in FIG. 1 in a manner which will be explained hereinafter) appearing at a terminal 232 is applied to operate the bistable circuit 242 for producing signals on a conductor 246 at the clock pulse repetition rate. When the bistable circuit 242 switches to a first condition, an output signal is applied by the upper element thereof to switch a second bistable circuit 244 to the same condition. In this condition, the upper element of the second bistable circuit 244 provides a ground potential on a conductor 254 for enabling a NOR gate 256 to transfer (in inverted form) signals appearing on a conductor 257 to reset the first bistable element 242 to its original state. When the next pulse of twice clock frequency switches the bistable circuit 242 to the opposite condition, an output signal is derived from the lower element thereof on the conductor 246. The output signal appears one-fourth of a bit interval after a system clock pulse since it is derived from the lower element of the bistable circuit 242 opposite the normal clock pulse output terminal. Thus, the output signal furnished the conductor 246 is of clock duration (one-half of a bit interval) but is delayed by one-fourth of a bit interval. The output signal thus will occur either in the middle of a bit interval of the information signals if the clock pulses are correctly phase synchronized or at the beginning of a bit interval if the clock pulses are out of phase.

The output signal controls the pulse produced at the output terminal of the NOR gate 230. Since changes in the condition of the information signals necessarily occur in the middle of each bit interval (assuming no missing information signals), if the clock pulses are already properly phased, an output signal will be produced by the NOR gate 230 (which compares the one-quarter delayed clock pulses on the conductor 246 with the change indication signals from the NOR gate 211 during the interval of the delayed clock pulse signal). The pulses from the gate 230 are applied for resetting the bistable circuit 244, which in turn disables the NOR gate 256 before a monostable circuit 258 can produce a delayed pulse for resetting the bistable circuit 242 through the NOR gate 256. These pulses from the gate 230 are also applied through the multiple contact switch 218 for phase synchronizating the clock pulses, as will be explained below.

On the other hand, if the delayed clock pulses on the conductor 246 are out of phase with the information signals, after a short period of information signal receipt a pulse sequence will occur in which no change indication signal will be produced by the NOR gate 211 during the portion of the bit interval in which a pulse is applied to the NOR gate 230. Thus, no pulse will be produced for resetting the bistable circuit 244, and the NOR gate 256 will remain enabled. As implied above, upon the generation of a pulse on the conductor 246 by the bistable circuit 242 a pulse is also applied to operate the monostable circuit 258 to produce a delayed pulse on the conductor 256. The delayed pulse will pass the NOR gate 256 to transfer the bistable circuit 242 to the opposite condition and shift the clock pulses into correct phase synchronization with the information signals.

The clock pulses appearing subsequent to phase synchronization appear at the clock pulse output terminal 262. Once the phase synchronization of the clock pulses is accomplished, they are transferred by the conductor 246 and applied to operate a monostable circuit 266. The monostable circuit 266 generates pulse signals of appropriate duration for enabling a NOR gate 268 to transfer the binary information conditions of the information signals. The information signals (in normal or inverted form depending on the coding) appearing at the input terminal 201 are applied to the gate 268 via the switch 225 and a conductor 269. The NOR gate 268 thus furnishes modified return-to-zero signals indicative of the original biphase information signals appearing at the terminal 201 while accomplishing substantial noise rejection. The modified return-to-zero signals are passed by the switch 215 to the output terminal 216 for operating the associated utilization circuitry, in the same manner as with the other types of signal coding prescribed above.

Figure 3:
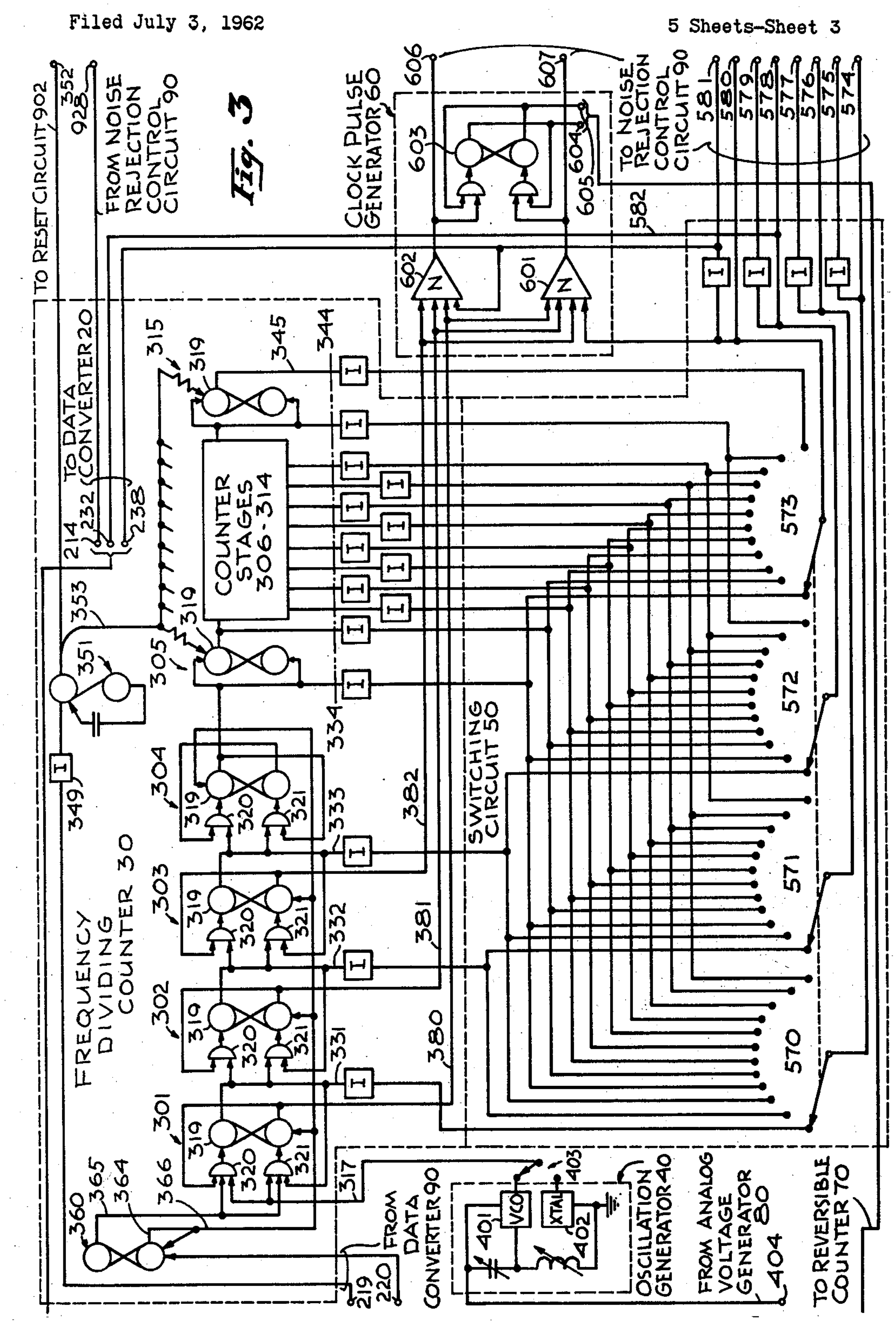
FIG. 3 is a block diagram of a frequency-dividing counter, a switching circuit and a clock pulse generator for use in the system shown in FIG. 1.

In FIG. 3 are shown circuit arrangements which may be used to accomplish the functions of the frequency-dividing counter 30, the switching circuit 50 and the clock pulse generator 60, shown in the system of FIG. 1. The frequency-dividing counter 30 comprises a number of stages 301–315 each including a two-state bistable circuit 319 connected in a conventional arrangement. Though fifteen stages 301–315 are indicated, either more or less may be utilized since the number of stages depends on the range of frequency division desired. The two elements of the bistable circuit 319 of each stage have individual input conductors, and an individual reset conductor is connected to the upper element of all but the first three stages which have a reset conductor connected at the lower element. In view of the fact that the synchronous clock pulse generator system of this invention may be used for generating clock pulses for use with information signals having extremely rapid bit repetition rates, the first stages of the frequency-dividing counter 30 which are switched most often must react very rapidly. To this end, each of the first four stages 301–304 has input gates 320 and 321 connected to transfer input signals to each of its two elements. These gates receive feedback signals reflecting the condition of the elements of the particular bistable circuit 319 so that interstage switching of bistable circuits 319 in response to rapid input signals is prevented except in the desired counting sequence. All of the stages 302–315 receive input signals derived from the upper element of the preceding bistable circuit 319. It should be noted that nine of the latter stages of the frequency-dividing counter circuit 30 are shown in block form for simplicity of illustration in FIG. 3. The stages 306–314 shown in block form are identical to the stages 305 and 315 immediately preceding and following them.

The first stage 301 receives driving oscillatory signals from the oscillation generator 40 via a conductor 317. The oscillations are furnished by a voltage-controlled oscillator 401 or a crystal oscillator 402, both of which are conventional in form, under control of a selector switch 403. The one of the oscillator 401 or 402 which is selected for providing the input signals depends on the stability of the bit repetition rate of the information signals expected, as discussed above. If the information signals transmitted to the system originate from a crystal controlled transmitter system, the crystal oscillator 402 may be used, while if the information signals originate from a relatively variable source or if doppler effect is expected to influence the transmission, the voltage-controlled oscillator 401 may be used. The voltage-controlled oscillator 401 receives control signals at a terminal 404 from the analog voltage generator 80 of FIG. 1. The voltage-controlled oscillator 401 may be initially set to furnish signals at a selected frequency which is an exact harmonic of the expected bit repetition rate of the information signals.

The oscillations generated by the oscillation generator 40 are applied by the conductor 317 to the stage 301 and cause the frequency-dividing counter 30 to count through its stages in sequential order. Thus, the conditions of the stages 301–315 will represent the count of the oscillations generated by the oscillation generator 40 from the time of reset of the frequency-dividing counter 30. Because the approximate bit repetition rate of the information signals is known, the condition of a particular stage of the frequency-dividing counter circuit 30 may be selected to provide output signals at the approximate bit repetition rate. Assuming that the oscillations from the oscillation generator 40 appear at an exact harmonic of the bit repetition rate, if the frequency-dividing counter 30 is reset at the instant a binary one signal appears, the count will start with the information signal receipt and the clock pulses will thereafter be synchronized with the information signals. As will be noted hereinafter, the frequency of the oscillations generated by the oscillation generator 40 may be controlled to be the appropriate exact harmonic of the bit repetition rate of the information signals so that the desired result will obtain. By selecting the frequency of the oscillations generated by the generator 90 to be a high enough harmonic of the desired information signal repetition rate, the phase synchronization accomplished may be made to be quite exact.

The frequency-dividing counter 30 is reset in the following manner to provide for the phase synchronization of the clock pulses with the information signals. The binary one indication signals provided from the opposite elements of the monostable circuit 280 of the data converter circuit 20 and appearing at the terminals 219 and 220 are transferred by an inverter circuit 349 to operate a pulse shaping monostable circuit 351 and a fast operating monostable circuit 360, respectively. The monostable circuit 351 is of conventional form and provides resetting signals to the last eleven stages 305–315 of the frequency-dividing counter 30 via a conductor 353. The fast operating monostable circuit 360 is connected in a conventional bistable form but has a unique feedback connection via a conductor 364 which causes the circuit to operate instead as a monostable circuit. A pulse signal applied at the fast operating monostable circuit 360 tends to switch the condition thereof. The change of condition, however, is reflected as a feedback signal on the conductor 364 which is applied as a reset signal to the input element and precludes a complete switching of the monostable circuit 360. However, the monostable circuit 360 produces extremely short duration output signals on its output conductors 365 and 366 during the interval of the attempted change of condition. The output signals on the conductor 366 are applied to reset the first four stages 301–304 of the frequency-dividing counter 30. Coincidently therewith, the output signals on the conductor 365 are applied to the input gates 320 and 321 of the first stage 301 to preclude the receipt of the oscillations from the oscillation generator 40 during the application of reset pulses.

As was pointed out above, the first four stages 301–304 must necessarily operate more rapidly than the following stages in order to handle rapidly reoccurring information signals. The fast acting monostable circuit 360 provides the short duration pulses for resetting the first four stages 301–304 much more rapidly than the subsequent stages 305–315 which may be reset by signals from the more conventional monostable circuit 351 since they need not reflect the rapid changes of the bit repetition rate. The monostable circuit 351 provides an additional output signal at a terminal 352, which is utilized (as will be discussed below) for resetting the noise rejection control circuit 90 (shown in FIG. 1) in response to binary one indication signals.

The frequency-dividing counter 30 thus receives an input drive oscillatory signal from the oscillation generator 40 and counts through its sequence to provide appropriate output clock pulses. The frequency-dividing counter 30 is reset in response to the binary indication signals from the data converter 20 which function to phase synchronize the clock pulses generated with the information signals. In order to select the appropriate repetition rate for the clock pulses output signals indicative of the conditions of one element of the circuits 319 of the stages 301–315 are derived on a number of conductors 331–345. These conductors are connected to the upper element of each of the stages 301–315 and reflect the conditions thereof. The conductors 331–345 are connected to a plurality of multiple terminal selector switches 570–573 within the switching circuit 50.

Each of the selector switches 570–573 is connected to all but three of the conductors 331–345; for example, the selector switch 570 has its contacts progressively connected to the conductors 331–342. The selector contacts of each of the selector switches 570–573 are physically ganged together in the manner shown so that signals in any position of the selector switches 570–573 are derived from four adjacent stages of the frequency-dividing counter 30, the four stages being selectable at will in accordance with the bit repetition rate of the information signals.

The output signals from the stages of the frequency-dividing counter 30 are passed by the switches 570–573 to a number of output terminals 574–581 in inverted and non-inverted form. The signals at the terminals 574–581 are utilized for operating the noise rejection control circuit 90, as will be explained below. The output signals derived through the switch 573 are also applied to the terminal 238 for transfer to the data converter 20 shown in FIG. 2 and to a pair of NOR gates 601 and 602 of the clock pulse generator 60 to determine the duration of the clock pulses. An output signal of twice the clock pulse rate is derived from the selector switch 572 and applied by a conductor 582 to the terminal 232 for providing clock phase synchronization with biphase information signals, as discussed above.

The clock pulse generator 60 includes a two-stage circuit 603 connected in conventional bistable form with an input gating arrangement for providing positive switching between its operational conditions. The input signals to the two-state circuit 603 are provided by the NOR gates 601 and 602 which receive input signals indicative of the conditions of the lower elements of the first three stages 301–303 and of the condition of the upper element of the stage of the frequency-dividing counter 30 selected by the selector switch 573. In order for the gate 601 to provide a signal, the lower elements of the bistable circuits 319 of the first three stages 301–303 and the lower element the selected stage must be in the on condition. For the NOR gate 602 to provide a signal, the lower elements of the bistable circuits 319 of the first three stages and the upper element of the bistable circuit 319 of the selected stage must be in the on condition.

Since the stage of the frequency-dividing counter 30, which has its output passed by the switch 573 remains in any condition for a period longer than the first three stages, the signals transferred by the switch 573 will determine the length of the clock pulses. Though the selected stage controls the clock pulse duration, the first three stages of the frequency-dividing counter 30 control the instant at which the NOR gates 601–602 start and cease the clock pulses so that the rapid switching necessary for furnishing clock pulses at extremely accurate times is realized. The clock pulses generated thus change condition in intervals short enough to allow synchronization with rapid condition changes in the information signals.

Since the requisite elements of the bistable circuits 319 are placed in the on condition when the reset signals are applied to the frequency-dividing counter 30, the NOR gate 602 will provide a signal to the two-stage circuit 603 for placing it in a state to produce a clock pulse of a first polarity at a terminal 604. Coincidently, therewith, an oppositely phased pulse (a "not-clock" pulse) is produced at a terminal 605, connected to the opposite element of the two-state circuit 603. After the frequency-dividing counter 30 has counted through its sequence to the point at which the selected stage has changed condition and the first three stages are in the initial condition, the NOR gate 601 will be operated and the clock and "not-clock" pulses reversed in polarity. These pulses continue until the initial condition is reached again and the polarities again reverse. Thus, there are produced clock and "not-clock" pulses each with two equal intervals of opposite polarity each of which equals one-half of a bit interval once synchronization is accomplished.

It should be noted that the reset connections are such that reset pulses place the frequency-dividing counter in an advance count condition. This arrangement enables the clock pulse generator 60 to switch in response to the faster switching stages 301–303 rather than the slower switching stages, the output from which is applied through the switch 573. Thus the clock pulses actually change phase seven counts after the stage selected by the switch 573 assumes the proper condition, so that the first three stages exert the proper rapid switching control over the NOR gates 601 and 602 for changing the state of the clock pulses in accordance of the input information signals.

Figure 4:
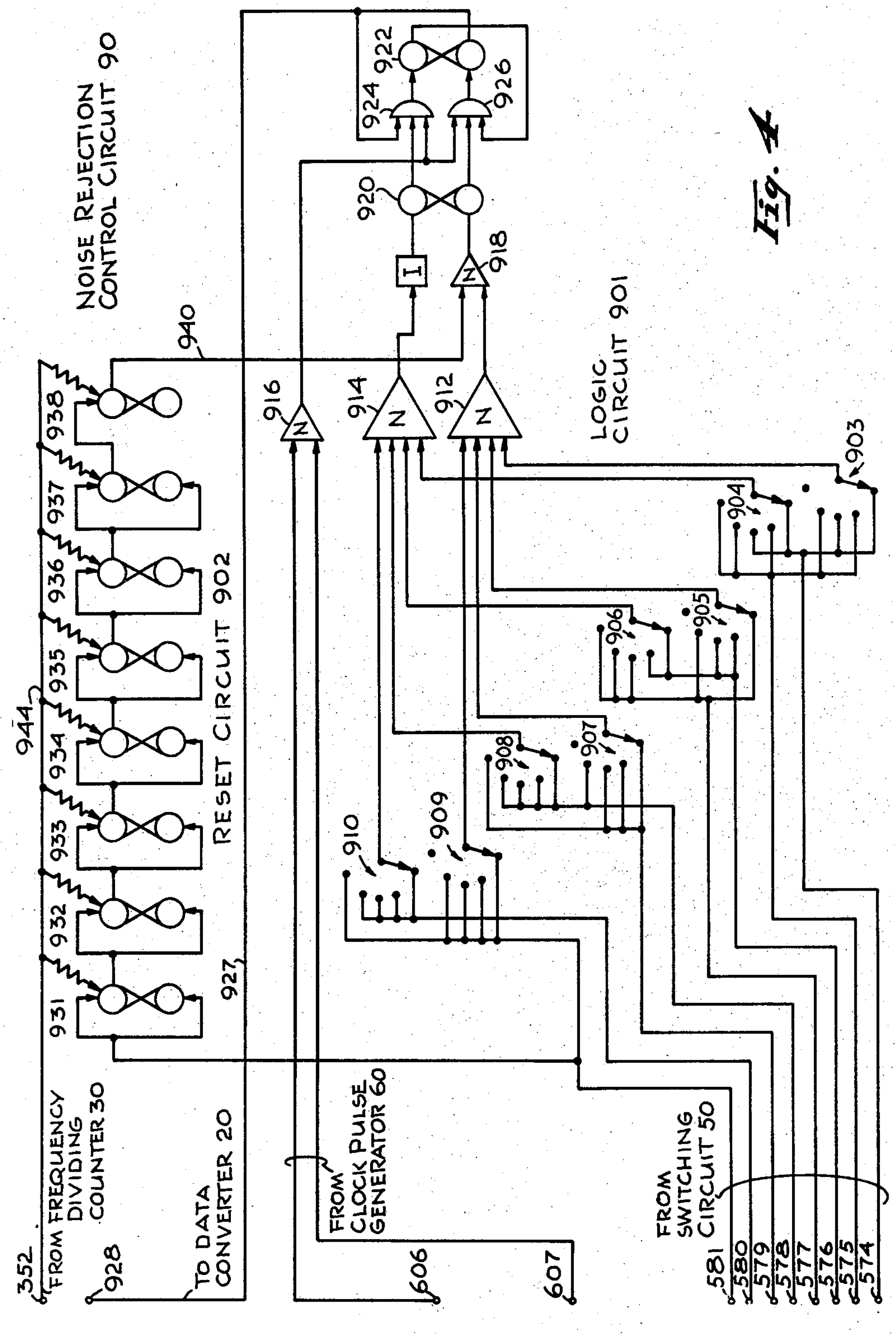
FIG. 4 is a block diagram of a noise rejection control circuit for use in the system shown in FIG. 1.

In FIG. 4 is shown a circuit arrangement which may be used for the noise rejection control circuit 90 of FIG. 1. The arrangement of FIG. 4 includes a logic circuit 901 which operates to accomplish the selection and direct control of the information sample width of the noise rejection NOR gates 210 and 213 of the data converter 20 shown in FIG. 2 and a reset circuit 902 which operates to override the normal control by section 901 and allow the acceptance of information signals by the data converter 20 continuously when a determination is made that the system of FIG. 1 has fallen out of synchronization.

The logic section 901 receives input signals which appear at a number of terminals 574–581 from the switching circuit 50. As explained above, the signals appearing at the terminals 574–581 reflect the condition of a selected four stages of the frequency-dividing counter 30, those signals applied at the terminals 580 and 581 appearing at the clock pulse repetition rate.

The signals appearing at the terminals 574–581 are applied to a number of five positions switches 903–910. The connections of the positions of each of the five positions switches 903–910 to the terminals 574–581 are such that a selected operation interval may be chosen during each clock pulse interval. The selector elements of each of the five position switches 903–910 are physically ganged together so that all five position switches select the same position coincidently. The five position switches 903, 905, 907 and 909 are all connected to a NOR gate 912 while the switches 904, 906, 908 and 910 are connected to a NOR gate 914. Thus the NOR gate 912 receives input signals reflecting the conditions of the lower elements of the bistable circuit 319 of the stages of the frequency-dividing counter 30 while the gate 914 receives input signals reflecting the conditions of the upper elements of the bistable circuits 319 of the stages of the frequency-dividing counter 30. When the stages of the frequency-dividing counter 30 are in the appropriate condition so that binary zero signals are received at all input terminals of the NOR gate 912, a signal is transferred for application to a NOR gate 918. This signal causes a bistable circuit 920 to change condition and apply an input signal to a gate 926 for changing a second bistable circuit 922 to a condition for enabling the noise rejection NOR gates 210 and 213 of the data converter 20 shown in FIG. 2. When the bistable circuit 922 changes condition, a signal is applied via a conductor 927 to a terminal 928 for further application at the terminal 214 of the data converter 20.

Ignoring the operation of the reset circuit 902 for the moment, this enabling condition of the bistable circuit 922 and the signal provided thereby continue until the NOR gate 914 receives binary zero signals at all of its input terminals in response to the appropriate conditions at the stages of the frequency-dividing counter 30 of FIG. 3. At that time the NOR gate 914 furnishes a signal for changing the condition of the bistable circuit 920 and providing an input signal for application to the bistable circuit 922 via a input gate 924. This signal changes the condition of the bistable circuit 922 and removes the enabling signal applied to the noise rejection NOR gates 210 and 213 (FIG. 2). As will be noted from FIG. 4, the NOR gates 924 and 926 also receive feedback input signals in a conventional manner from the circuit 922 and input signals from a NOR gate 916. The NOR gate 916 receives input signals applied at the terminals 606 and 607 from the clock pulse generator 60 shown in FIG. 3. The signals at the terminals 606 and 607 reflect the change of state of the clock pulse generator 60 as transferred through the NOR gates 601 and 602.

Thus the position of five position switches 903–910 determines the information sample period of the noise rejection NOR gates 210 and 213. This period remains a constant percentage of the clock pulse interval in an position of the selector switch 573 of FIG. 3 since it depends directly on the length of the pulse transferred thereby. Furthermore, the percentage remains the same for any position of the position switches 903–910 even though the bit repetition rate of information signals changes since it is directly controlled by the length of the clock pulse interval which is in turn controlled by the bit repetition rate.

The reset circuit 902 receives input drive pulses at the terminal 581 which appear at the clock pulse repetition rate. The reset circuit 902 has a number of stages 931–938 of bistable two-state circuits connected in a conventional counter arrangement. The number of stages used in the reset circuit 902 is determined by the length of time which it is feasible to allow to pass without receiving information signals before resynchronizing the system. The reset circuit 902 operates to count the clock pulses generated by the frequency-dividing counter 30 of FIG. 3. The reset circuit 902 counts through its sequence to provide an output signal on a conductor 940. The signal from the last stage 938 is transferred by the conductor 940, passed by the NOR gate 918 and applied to place the bistable circut 922 in the condition in which an enabling signal is transferred to the noise rejection NOR gate 210 and 213 of FIG. 2. This condition continues to maintain the noise rejection NOR gates 210 and 213 of the data converter 20 conducting to transfer all input signals until the reset circuit 902 is reset upon the receipt of binary one information signals. The reset circuit 902 receives resetting signals at the terminal 352 from the frequency-dividing counter 30 of FIG. 3. The signals applied are those generated by the monostable circuit 351 in response to the binary indication signals and therefore indicate the actual receipt of information signals during the established information sample period. Thus, in the synchronized condition, the reset circuit 902 will count for only a short period before being reset by binary one indication signals received at the terminal 352. However, should binary one information signals be missing for a time sufficient to allow the reset circuit 902 to count to the last stage 938, a signal will be applied via the conductor 940 to enable the noise rejection NOR gates 210 and 213 continuously until binary one information signals are again received.

Figure 5:
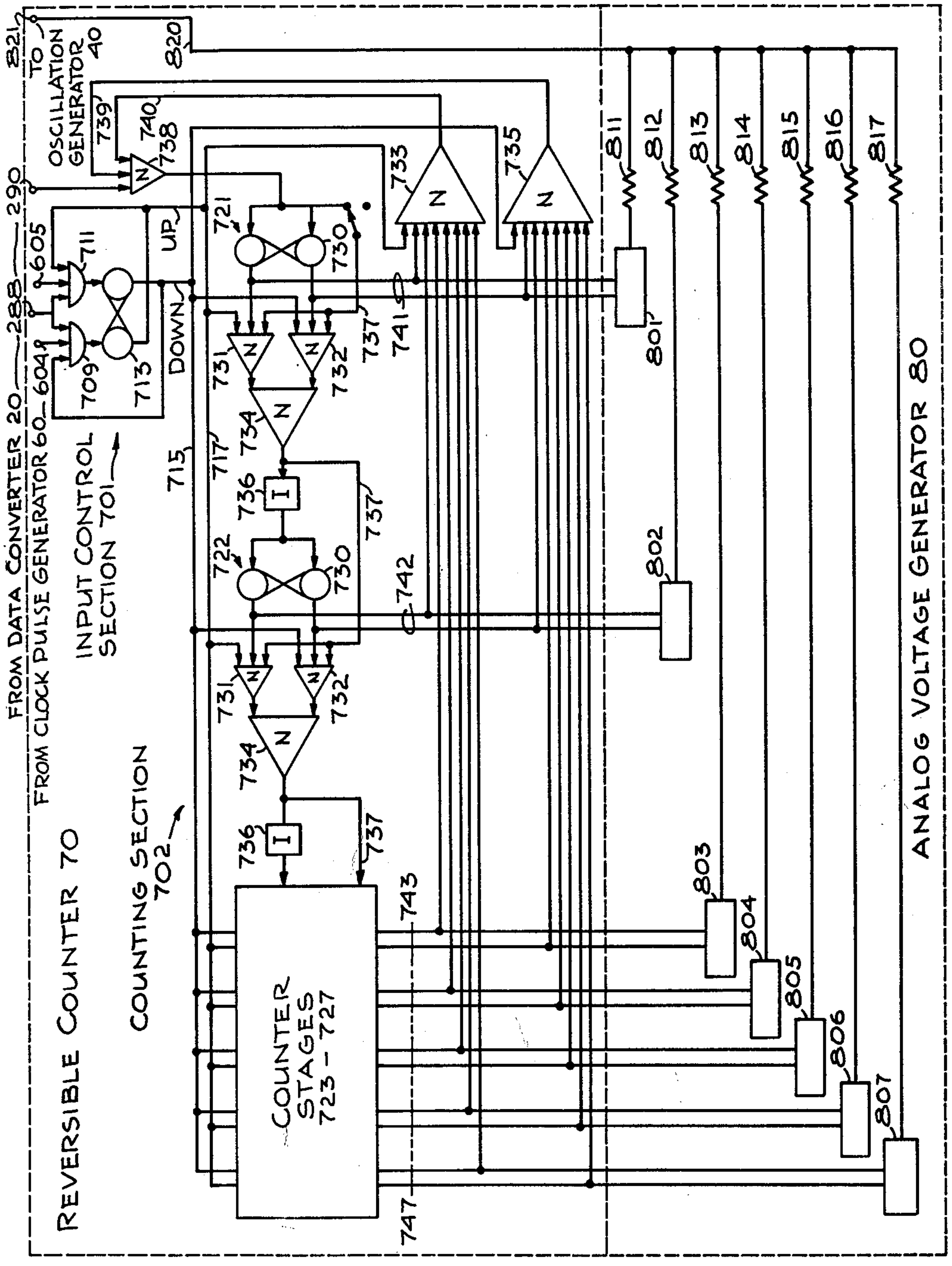
FIG. 5 is a block diagram of a reversible counter for use in the system shown in FIG. 1.

In FIG. 5 are shown circuits which may be utilized to accomplish the functions of the reversible counter 70 and the analog voltage generator 80 of FIG. 1. The reversible counter 70 includes an input control section 701 and a counting section 702. The input control section 701 includes a bistable circuit 713 arranged with input gates 709 and 711 connected for controlling the direction or sense of the count accomplished by the counting section 702. The gates 709 and 711 receive input signals which appear at the terminal 288 from the fast operating monostable circuit 282 of the data converter 20. The monostable circuit 282 is similar to the monostable 360 of the frequency-dividing counter 30 in operating as an extremely rapid monostable circuit. The signals from the monostable circuit 282 are indicative of the binary one information signals as derived at the multiple contact switch 218 of the data converter 20, as explained above. The gate 709 also receives the clock pulses appearing at terminal 604 of the clock pulse generator 60 shown in FIG. 3. The gate 711 receives opposite phase or "not-clock" pulses appearing at the terminal 605 of the clock pulse generator 60. Each of the gates 709 and 711 also receives input signals indicative of the condition of one of the elements of the bistable circuit 713 in a conventional manner.

In operation, a clock pulse appears at the terminal 604 and is applied to the gate 709 during the first half of the clock pulse interval while a "not-clock" pulse appears at the terminal 605 and is applied to the gate 711 during the second half of the clock pulse interval. A binary one indication signal which appears during the portion of the clock pulse interval in which a clock pulse is present at the terminal 604 is passed by the gate 709 and places the bistable circuit 713 in a condition to provide an output signal on a conductor 717 for directing the counting section 702 to count in an increasing sense, i.e., count up.

On the other hand, if a binary one information signal is applied to the gate 711 during an interval in which a "not-clock" pulse is applied thereto, the gate 711 passes a signal for placing the bistable circuit 713 in a condition to provide an output signal on a conductor 715 for directing the counting section 702 to count in a decreasing sense, i.e., count down. Thus the time of appearance of a binary one information signal (which indicates the beginning of a bit interval of the information signal) with respect to the portion of the clock pulse interval controls the sense of operation of the counting section 702.

The counting section 702 comprises a plurality of bistable stages 721–727 (the latter five of which are shown in block diagram form for ease of illustration) which are arranged to perform the reversible counting sequence either up or down from an intermediate count registered therein. Each of the stages 721–727 includes a bistable two-state circuit 730 arranged with input terminals connected to each of its elements and connected in a conventional manner. Each stage alo includes a pair of NOR gates 731 and 732. The NOR gates 731 receive input signals from the upper element of each of the bistable circuits 730, from the conductor 717 which transfers signals signifying an up count and from carry conductors 737. The NOR gates 732 receive input signals from the lower element of the bistable circuits 730, from the conductor 715 which transfers signals signifying a down count and from the carry conductors 737. The output signals from the NOR gates 731 and 732 are applied to NOR gates 734 and therefrom through an inverter circuit 736 to the input conductors connected to the bistable circuits 730 of the succeeding stages.

Input signals for operating the first stage 721 of the counting section 702 appear at the terminal 290 from the data converter 20 of FIG. 2. The input signals are binary one indication signals passed by the switch 218 of the data converter 20 which are delayed by the serially arranged monostable pulse generating circuits 284 and 286 to appear at the terminal 290 for application to the first stage 721 after the binary one indication signals have appeared at the input terminal 288.

The binary one indication signals appearing at the terminal 290 are passed by a NOR gate 738 to the input conductors of the bistable circuit 730 of the first stage 721. The NOR gate 738 also receives input signals on conductors 739 and 740 from a pair of NOR gates 733 and 735. The NOR gate 733 is connected to receive signals from the conductor 717 signifying an up count and from the upper element of the bistable circuits of all stages 721–727 so that if the count is at a maximum when an up count is directed, a signal will be provided by the NOR gate 733 for inhibiting the transfer of input signals by the NOR gate 738 to the first stage 721. On the other hand, the NOR gate 735 receives signals indicative of the conditions of the lower elements of each of the bistable circuits 730 and a signal on the conductor 715 indicating a down count. The gate 735 thus provides a signal for inhibiting the transfer of input signals by the gate 738 when the counting section 702 is in its lowest counting condition and a signal is given for a further down count.

Thus, the gates 733 and 735 prohibit the counting section 702 from receiving binary one indication signals when the counter has reached a maximum count in either direction since a change in the count in that particular direction would cause all stages of the counter to change state. This is necessary since the output of the stages 721–727 is utilized to operate the voltage-controlled oscillator 401 of the oscillation generator circuit 40 shown in FIG. 3. A reset of the counting section 702 in response to an overflow input signal would actually cause a control signal which would be directly opposed to the correct control signal to be directed to the voltage-controlled oscillator 401.

In the operation of the reversible counter 70, the signals from the input control section 701 are first applied for determining the sense of the count. For example, assuming a binary one indication signal appears at the terminal 288 during the portion of the clock interval in which a clock pulse appears at the terminal 604, the bistable circuit 713 will furnish an output signal on the conductor 717 for directing an up count. The signal on the conductor 717 is applied to each of the NOR gates 731. Coincidently therewith, an inhibiting signal is applied by the carry conductors 737 to each of the NOR gates 731 and 732 in order to preclude the initiation of a count during the application of the count-sense-determination signals. When the delayed binary one indication signal appears at the terminal 290 for operating the counting section 702, each of the NOR gates 731 has a binary zero signal applied on the input conductors connected to the conductor 717 while the gates 732 have binary one signals applied by the conductors connected to the conductor 715.

The binary one indication signal appearing at the terminal 290 transfers the bistable circuit 730 of the first stage 721 to one of its two conditions. Assuming that the bistable circuit 730 of the first stage 721 is switched to the condition wherein an output signal is produced by the upper element and applied to the gate 731, the gate 731 furnishes a binary one signal and the NOR gate 732 furnishes a binary zero signal to the NOR gate 734. The signals cause the NOR gate 734 to apply a binary zero signal through the inverter circuit 736 to the input conductors connected to the bistable circuit 730 of the second stage 722.

On the other hand, if a down count is signified by the application of a binary zero signal on the conductor 715 to the gates 732 and the input signal appearing at the terminal 290 is such as to place the upper element of the circuit 730 of the first stage 721 in a condition to produce an output signal, the gate 732 of the stage 721 furnishes a binary zero signal to the NOR gate 734, as does the NOR gate 731. The NOR gate 734 thus furnishes a binary one signal through the inverter circuit 736 to the input conductors connected to the bistable circuit 730 of the next succeeding stage 722.

In the foregoing manner an up count will be directed by an input signal applied on the conductor 717 while a down count will be directed by an input signal applied by the conductor 715. Thus the counting section 702 is operated to count in a sense determined by the signals applied at the input control section 701.

As pointed out above, the condition of each of the stages 721–727 is derived on a plurality of pairs of conductors 641–657 for application to the overflow control gates 733 and 735. The signals are also furnished to a plurality of summing circuits 801–807 of the analog voltage generator 80. The summing circuits 801–807 are basically two position electronic switches which provide output signals indicative of a first condition of the associated stages 721–727 of the counting section 702. The output signals are furnished through a plurality of resistors 811–817 to a common conductor 820 for application to a terminal 821 and transfer to control the voltage-controlled oscillator 401 of the oscillation generator 40.

As mentioned before, each of the resistors 811–817 has a value different from the value of the other resistors. For example, the resistor 811 will have a resistance value twice that of the resistor 812, while the resistor 812 may have a resistance value twice that of the resistor 813 and so on. The electronic switches operate to either connect a source of reference voltage to the appropriate resistor or to connect that resistor to a ground potential depending on the state of that stage of the counter. In this manner, the output currents furnished by the summing circuits 801–807 connected to the reference voltage (not shown) are weighted according to the state of each of the associated stages of the reversible counter 70 and an output voltage is developed across any of the other resistors connected to the ground potential. Thus, the summing circuits 801–807 cooperate with the resistors 811–817 to provide output voltage signals, which are proportional to the count of the counting section 702 of the reversible counter 70. In this manner, the digital count stored in the counting section 702 is converted to an analog voltage signal for controlling the voltage-controlled oscillator 401 of the oscillation generator 40. This arrangement is a well known circuit for producing an analog voltage output from a digital counter.

A number of advantages are provided by the foregoing arrangement; although they have been pointed out above, they will be re-emphasized in order to highlight the inventive aspects of the system shown in FIG. 1. For example, since the reversible counter 70 counts in response to the binary one indication signals derived from the information signals, the rate of correction depends upon the bit repetition rate of the information signals. Thus, if the counting information signal bit repetition rate is extremely rapid, the counting accomplished by the reversible counter 70 for correcting the rate of the clock pulses is extremely rapid. This is in contrast to prior art arrangements which utilized integrating techniques to control a pulse generator and necessarily have a fixed time constant. Furthermore, since the counting sequence of the reversible counter 70 is directed in response to binary one indication signals applied at the terminal 288, the reversible counter is operated only in response to such signals. If binary one information signals are not transferred to the system shown in FIG. 1, the count stored in the reversible counter 70 remains constant, and the output signals derived therefrom by the analog voltage generator 80 maintain the operation of the oscillation generator 40 constant. For this reason, the reversible counter 70 enables, by its use of digital techniques, clock pulse generation to continue at an established rate even in the absence of signals without fear of drift of the oscillation frequency.

The particular circuits shown for accomplishing the generation of synchronous clock pulses are described above by way of example only of the manner in which the various aspects of the invention may be used to advantage; and it will be appreciated that the invention is not limited thereto. Accordingly, any and all modifications, alterations and equivalent arrangements falling within the scope of the following claims should be considered to be a part of the invention.

What is claimed is:

1. A system for generating clock pulses comprising means for receiving binary information signals, means for deriving a pulse signal indicative of each occurrence of a first binary condition of the information signals, means for generating oscillation at a controllable frequency, a first counter circuit operated in response to a given number of oscillations generated by said generating means for providing clock pulses, means for resetting the first counter circuit to an initial count in response to each pulse signal, a reversible counter, means for operating the reversible counter to count in a first sense in response to the coincidence of a pulse signal with a first interval of each clock pulse and to count in a second sense in response to the coincidence of a pulse signal with a second interval of each clock pulse, and means for deriving a control signal depending on the condition of the reversible counter, said control signal being coupled to said generating means for controlling the frequency of said oscillations.

2. A synchronous clock pulse generator system comprising means for receiving digital information signals having a particular bit repetition rate when generated, means coupled to said receiving means for deriving pulse signals indicative of each first digital condition of the information signals, a frequency-dividing counter circuit, a voltage-controlled oscillator coupled to said frequency-dividing counter circuit for providing oscillations at a variable frequency for operating the frequency-dividing counter circuit, gating means for transferring the pulse signals indicative of the first digital condition of the information signals to reset the frequency-dividing counter circuit to an initial state, digital counter means for providing a total digital count representing the difference between the rate of generation of oscillations by the voltage-controlled oscillator and the most rapid rate of appearance of the pulse signals, said reversible counter means being coupled to provide a digital count representative of the bit repetition rate of the digital information signals, means for providing a voltage level proportional to the digital count of said means for deriving a digital count, said voltage level being coupled to control the rate of generation of pulses by the voltage-controlled oscillator, and means for deriving clock pulses from the frequency-dividing counter circuit and coupled between the frequency dividing counter circuit and the gating means for enabling the gating means only during predetermined portions of the clock pulses.

3. A synchronizing system comprising means for receiving input signals carrying digital information coded at prescribed bit repetition rates; means coupled to said receiving means for controlling the time of receipt of the input signals by said receiving means; and a synchronous pulse generator including a frequency-divider, a voltage-controlled oscillator for generating oscillations for operating the frequency-divider to provide output signals to actuate the controlling means at a selectable harmonic of the frequency of the oscillations generated, means for applying the input signals at selected intervals to reset the frequency-divider circuit, means for providing signals indicative of the difference between the repetition rate of the output signals from the frequency-divider circuit and the bit repetition rate of the input signals, a reversible counter circuit operatively responsive to the difference indicative signals, and means operatively responsive to the condition of the reversible counter circuit for providing a voltage to control the voltage-controlled oscillator.

4. A pulse generator system comprising means for receiving digital input signals in which information is represented in one of a plurality of distinct binary codes, converter means coupled to said receiving means for generating first signals representing the information content of the digital input signals in a selected digital code, means for generating gate pulses at a selectable repetition rate, gating means for transferring the first signals for initiating each repetitive operation of said gate pulse generating means, means operatively responsive to said gate pulses for controlling the time of operation of the gate means for transferring said first signals, a reversible counter, input means coupled to said gate pulse generating means and said converter means for operating the reversible counter in a first sense and in a second sense depending on the time of appearance of the gate pulses relative to the time of appearance of the first signals, and means coupled between said reversible counter and said pulse generating means for providing control signals to the pulse generating means indicative of the count contained in the reversible counter for selectively controlling the repetition rate of pulse generating means to provide pulses synchronized with the input signals.

5. A synchronous pulse generator comprising means for receiving a binary-coded digital information signals having a variable bit repetition rate, means for representing the information content of the information signals by binary coded signals, means for generating pulses at a selectable repetition rate, means for transferring signals representative of a first binary condition of said information signals for initiating the generation of pulses by said pulse generating means including means for selectively controlling the operating time of said signal transferring means in response to pulses generated by said pulse generating means, a reversible counter circuit, means for controlling the selectable repetition rate of pulses from the pulse generating means in response to the count contained in the reversible counter, and comparing means for operating the reversible counter in a first sense when the selectable repetition rate of the generated signals is greater than the bit repetition rate of the binary coded signals and in a second sense when the selectable repetition rate of the generated signals is less than the bit repetition rate.

6. A circuit for providing pulses at a repetition rate substantially identical to the bit repetition rate of a pulsed digital input signal including means for generating oscillations at a selectable frequency, a frequency-dividing counter circuit operative to count the generated oscillations, means for resetting the frequency-dividing counter circuit to an initial condition in response to selected portions of the input signal, a reversible counter for storing a count signal proportional to the selectable frequency for selectively operating the oscillation generating means, and means for operating the reversible counter in a first sense in response to the receipt of an input signal pulse during a first condition of the frequency-dividing counter circuit and in a second sense in response to the receipt of an input signal pulse during a second condition of the frequency-dividing counter circuit.

7. In a clock pulse generator for a data processing system, the combination of an input circuit for receiving digital information signals; data converter means operative to convert digital information signals received by the input circuit to signals coded in a predetermined pulse form; and means for providing pulses synchronized with digital information signals comprising controllable oscillator means for providing signals at a predetermined rate proportional to the level of a voltage input signal, means for comparing the time coincidence of signals provided by the oscillator means and the data converter means, and digital counting means operatively responsive to the comparison for providing the voltage input signal to the oscillator means for controlling the signal rate thereof.

8. A pulse generator system comprising an input circuit for receiving digital information signals; a data converter circuit operative responsive to the digital information signals for providing output signals in a predetermined digital code; means for deriving clock pulses from the signals provided by the data converter circuit comprising a divider circuit having an output detector means operatively responsive to the output of the divider circuit and to signals from the data converter circuit for comparing the times of appearance thereof, counter means operatively responsive to the detector means for counting in a first or a second direction, means for providing a voltage level determined by the count contained in the counter means, oscillator means for providing oscillations at a rate determined by said voltage level, the divider circuit being connected to provide an output signal responsive to oscillations from the oscillator means; and gate means for controlling the data converter circuit to operate only at the expected time of receipt of each digital information signal when the divider circuit output occurs.

9. A pulse generator for data processing systems comprising means for receiving digital input signals, means for generating clock pulses, means for phase synchronizing the clock pulses and the digital input signals, means for controllably transferring received digital input signals from said input signal receiving means to operate said phase synchronizing means, means responsive to the clock pulses for operating said transferring means, counter means for storing a second digital count representative of intervals separating each identical portion of the clock pulses and each reoccurring portion of the digital input signals, and means operative in response to the second digital count for causing said clock pulse generating means to vary the frequency of the clock pulses generated.

10. A synchronizer comprising clock pulse generating means, means for receiving binary information signals, means for measuring the phase rate of reoccurrence of received binary information signals, counter means responsive to the measuring means for storing a digital count representation of the rate of reoccurrence of binary information signals of one type, and means for operating the clock pulse generating means in response to the digital count representation to vary the rate of generation of the clock pulses.

11. A synchronizer comprising means for receiving digital signals generated at a selected bit repetition rate; pulse generating means; means for measuring the phase synchronization of pulses generated by the pulse generating means with the received digital signals; means responsive to said phase synchronization measuring means for deriving a digital count representative of the difference between the rate of generation of pulses by the pulse generating means and the bit repetition rate of received digital signals; means operatively responsive to the derived digital count for varying the rate of generation of pulses by the pulse generating means; means for transferring signals from the digital signal receiving means to the phase synchronization measuring means; and means for controlling the transfer of the signals by the signal transferring means including a frequency divider circuit having a plurality of stages operative responsive to pulses from the pulse generating means, a bistable circuit for controlling the operational time of the signal transferring means, and means for deriving signals from individual stages of the divider circuit for controlling the condition of the bistable circuit.

12. A pulse generator system comprising means for receiving digital information signals having a bit repetition rate; gating means for controlling the transfer of information signals from said receiving means; means for generating timing signals at a selectable frequency; means for phase synchronizing the generated timing signals with transferred information signals comprising a resettable divider circuit operative responsive to the generated signals for producing output pulses at a subharmonic of the generated signals, and means for resetting the divider circuit in response to transferred information signals; means for storing a digital signal representative of a difference in the bit repetition rate and the selectable frequency comprising first and second gates, the first gate being operative responsive to the coincidence of a first portion of a generated timing signal with a transferred information signal for generating a first output signal, the second gate being operative responsive to the coincidence of a second portion of a generated timing signal with a transferred information signal for producing a second output signal, and a bi-directional counter operative in a first direction in response to the first output signals from the first gate and in a second direction in response to the second output signals from the second gate; and means for controlling the frequency of signals produced by the signal generating means comprising means for deriving a voltage level indicative of the count contained in the counter for varying the frequency of operation of the timing signal generating means.

13. A clock pulse generator for a data processing system comprising a resettable divider circuit having a plurality of stages, means for providing oscillations at a variable rate to operate said divider circuit, means for receiving binary information signals reoccurring at a variable bit repetition rate and transferring binary ones of said input information signals to reset said divider circuit, means for selectively deriving clock signals at a determinable rate from predetermined stages of said divider circuit, means for comparing the time of occurrence of the clock signals from said divider circuit with the time of occurrence of binary ones to generate first and second pulses, reversible counter means operatively responsive to the first and second pulses from the comparing means for providing a digital signal representative of the difference between the rates of repetition of the clock signals derived from said divider circuit and of the binary information signals, and means for controlling the rate of the oscillations provided to operate said divider circuit including digital-to-analog converter means for deriving analogue signals proportional to the digital signal in said reversible counter means to operate the means for providing oscillations at a variable rate.

14. A clock pulse generator as defined in claim 13 further comprising crystal-controlled oscillator means for generating oscillations at a predetermined frequency, and means for selectively connecting the crystal-controlled oscillator means to operate said divider circuit in place of said means for generating oscillations at a variable rate.

15. A synchronous clock pulse generator comprising an input circuit including means for receiving digital information signals having a variable bit interval; a data converter connected to the input circuit, said data converter having means for providing signals indicative of the beginning of bit intervals of the digital information signals, a data output terminal, and a noise rejection gating arrangement; a frequency-dividing counter; a voltage-controlled oscillator for furnishing driving oscillations of selectable frequency to the frequency-dividing counter; means for applying the signals indicative of the beginning of bit intervals to reset the frequency-dividing counter; a switching circuit connected to the frequency-dividing counter for deriving clock pulses at a selectable subharmonic frequency of the driving oscillations; a reversible counter connected to receive the signals indicative of the beginning of the bit intervals, the reversible counter having input means for controlling the sense of its count in response to the phase of the clock pulses relative to the signals from the data converter; an analog-voltage generator connected to monitor the count contained in the reversible counter to provide control voltages for controlling the voltage-controlled oscillator; and a noise rejection control circuit operated in response to clock pulses to control the operation of the noise rejection gating arrangement of the data converter.

16. A synchronous clock pulse generator comprising means for receiving binary-coded digital information signals, a data converter for deriving first signals indicative of the beginning of individual digit intervals of the binary coded information signal, a frequency-dividing counter for generating clock pulses, a voltage-controlled oscillator for operating the frequency-dividing counter, means for transferring the first signals to reset the frequency-dividing counter, a reversible counter for counting said first signals, means for measuring the phase of the first signals with respect to the clock pulses to operate the reversible counter to increase or decrease the count, and an analog voltage generator connected to monitor the count contained in the reversible counter for providing voltages for controlling the voltage-controlled oscillator.

17. A device for receiving binary-coded information from an intermittent operating external source comprising input means for receiving said binary-coded information, counter means for registering a count proportional to the bit repetition rate of the binary coded information received, pulse generating means responsive to the count registered in said counter means for producing pulses at a rate closely approximating the bit repetition rate of said binary-coded information, control means for varying the count registered by said counter means in response to a difference between the bit repetition rate and the pulse rate, and timing means for disabling said control means during intervals in which binary coded information is not being received, whereby said pulse generating means maintains the rate in the absence of binary coded information.

18. A circuit for receiving binary-coded information from an external source, said information having a bit repetition rate which may be variable, comprising a pulse generator for producing pulses at a variable rate approximating the bit repetition rate of said binary-coded information, comparing means for measuring the phase synchronization of said pulses and the bits of binary-coded information, reversible counter means coupled to said comparing means for registering a digital count proportional to the variable rate and for changing said count in response to the sense of the phase synchronization measured, and control means coupled to said pulse generator and said counter means for varying the rate of the pulse generator in response to said digital count.

19. The circuit of claim 18 wherein said pulse generator includes a voltage controlled oscillator, resettable counter means for counting the number of pulses from the oscillator between adjacent bits of binary coded information, said resettable counter being connected to be reset by each received bit of binary-coded information, means connected to said resettable counter for maintaining the digital count in said reversible counter when said resettable counter has reached a predetermined count without reset, whereby the pulse rate of said pulse generator is maintained during intervals in which binary-coded information is not being received by the circuit.

20. The synchronizer of claim 10 further including a noise rejection circuit for receiving the information signals in the form of binary coded information having a relatively long bit interval comprising an input circuit for converting said binary coded information into digital pulses each occupying only a small portion of the relatively long bit interval, coincident gating means connected to said input circuit to pass said digital pulses, pulse generating means for generating a gating pulse having a repetition rate equal to the bit repetition rate of the binary coded information signals, said gating pulses having a normal pulse width approximately equal to the pulse width of said digital signals and being phase synchronized therewith, said coincident gating means producing an output pulse when said gating pulses and said digital signals coincide, additional counter means connected to receive said gating pulses and said digital pulses for counting the number of gating pulses between adjacent digital pulses, means responsive to an output of said additional counter means for increasing the width of subsequent gate pulses, whereby the gating means is opened for a longer interval during each bit interval in the absence of incoming binary-coded information, and the gating means is held closed to the passage of signals therethrough for all but the short interval of time during the occurrence of a digital signal when binary-coded information is being received.

21. A synchronous clock pulse generating system comprising means for receiving and transferring pulsed digital input signals occurring at a variable repetition rate; means for generating oscillations at a controllable repetition rate; means for generating a clock pulse upon receipt of a predetermined number of oscillations during the interval after each pulsed digital input signal; means for detecting the time difference between each clock pulse and the corresponding pulsed digital input signal; means for providing a digital count level proportional to the repetition rate of the pulsed digital input signals; means for varying the digital count level by a fixed increment in response to the detected time difference; means responsive to the digital count level for controlling the repetition rate of the oscillations; and means for inhibiting the transfer of the pulsed digital input signals including a gating circuit for selectively transferring the pulsed digital input signals, means responsive to the clock pulses for providing gating signals, and means operated by the gating signals for regulating the condition of said gating circuit to selectively transfer the pulsed digital input signals.

22. A synchronous clock pulse generating system as defined in claim 21 wherein said clock pulse generating means includes frequency divider means for counting the oscillations, and means for resetting the frequency divider means to an initial count in response to received pulsed digital input signals.

References Cited in the file of this patent

UNITED STATES PATENTS

| | | |
|---|---|---|
| 2,636,988 | Palmer | Apr. 28, 1953 |
| 2,799,727 | Segerstrom | July 16, 1957 |
| 2,843,669 | Six et al. | July 15, 1958 |
| 2,888,647 | Beter et al. | May 26, 1959 |
| 2,903,677 | Curtis | Sept. 8, 1959 |
| 2,926,341 | Scarbrough | Feb. 23, 1960 |
| 3,041,585 | Wolfe | June 26, 1962 |
| 3,052,875 | Heberling | Sept. 4, 1962 |
| 3,078,344 | Crafts et al. | Feb. 19, 1963 |
| 3,078,451 | Sable | Feb. 19, 1963 |

UNITED STATES PATENT OFFICE
CERTIFICATE OF CORRECTION

Patent No. 3,142,802 July 28, 1964

Douglas R. Maure

It is hereby certified that error appears in the above numbered patent requiring correction and that the said Letters Patent should read as corrected below.

Column 1, line 72, after "if" insert -- in --; column 2, line 34, for "durng" read -- during --; line 49, for "subjected" read -- subject --; column 7, line 8, for "to", second occurrence, read -- at --; column 16, line 71, for "alo" read -- also --; column 18, line 27, for "641-657" read -- 641-647 --.

Signed and sealed this 1st day of December 1964.

(SEAL)
Attest:

ERNEST W. SWIDER
Attesting Officer

EDWARD J. BRENNER
Commissioner of Patents